(12) United States Patent
Modai et al.

(10) Patent No.: US 11,755,618 B2
(45) Date of Patent: *Sep. 12, 2023

(54) STATELESS STREAM HANDLING AND RESHARDING

(71) Applicant: Iguazio Systems Ltd., Herzliya (IL)

(72) Inventors: Ori Modai, Ramat Hasharon (IL); Orit Nissan-Messing, Hod Hasharon (IL); Yaron Haviv, Tel Mond (IL)

(73) Assignee: Iguazio Systems Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,915

(22) Filed: Mar. 6, 2018

(65) Prior Publication Data

US 2019/0278863 A1    Sep. 12, 2019

(51) Int. Cl.
*G06F 16/00* (2019.01)
*G06F 16/27* (2019.01)
*G06F 16/23* (2019.01)
*G06F 16/2455* (2019.01)

(52) U.S. Cl.
CPC ........ *G06F 16/278* (2019.01); *G06F 16/2365* (2019.01); *G06F 16/24568* (2019.01)

(58) Field of Classification Search
CPC ............... G06F 16/278; G06F 16/2455; G06F 16/2228; G06F 16/213; G06F 16/22

USPC .......................................................... 707/736
See application file for complete search history.

(56) References Cited

U.S. PATENT DOCUMENTS

| | | | |
|---|---|---|---|
| 9,269,057 B1* | 2/2016 | Chandra | G06N 20/00 |
| 2017/0103116 A1* | 4/2017 | Hu | G06F 16/217 |
| 2019/0102476 A1* | 4/2019 | Liu | G06F 16/30 |
| 2019/0163545 A1* | 5/2019 | Singh | G06F 16/22 |

* cited by examiner

*Primary Examiner* — Chelcie L Daye
(74) *Attorney, Agent, or Firm* — Bochner PLLC; Ariel Reinitz

(57) ABSTRACT

Systems and methods are disclosed for stateless stream handling and resharding. In one implementation, a first shard comprising one or more messages is generated. The first shard is associated with a first state attribute. The first shard and the first state attribute are provided as an update within a data stream. In another implementation, a first shard including a first state attribute is received within a first stream. A message that is inconsistent with the first state attribute is identified within the first shard. The message is associated as an attribute of the first shard. A second shard including a second state attribute is received. Based on the second state attribute, a position of the message within the second shard is determined. The message is inserted into the second shard based on the determining.

20 Claims, 11 Drawing Sheets

STATELESS STREAM HANDLING AND RESHARDING

TECHNICAL FIELD

Aspects and implementations of the present disclosure relate to data processing and, more specifically, but without limitation, to stateless stream handling and resharding.

BACKGROUND

Streaming systems can include devices that provide or push data on a regular basis. Other devices may request or pull this data, e.g., in order to process it.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for stateless stream handling and resharding. In one implementation, a first shard comprising one or more messages is generated. The first shard is associated with a first state attribute. The first shard and the first state attribute are provided as an update within a data stream.

In another aspect of the present disclosure, a first shard including a first state attribute is received within a first stream. A message that is inconsistent with the first state attribute is identified within the first shard. The message is associated as an attribute of the first shard. A second shard including a second state attribute is received. Based on the second state attribute, a position of the message within the second shard is determined. The message is inserted into the second shard based on the determining.

In another aspect of the present disclosure, a first shard including one or more messages is received. The first shard is associated with a first state attribute. The first shard and the first state attribute are provided as an update within a data stream.

In another aspect of the present disclosure, a first shard including one or more messages is generated. The first shard is associated with a first shard version attribute. The first shard and the first shard version attribute are provided as a first update within a data stream. The first shard is resharded into at least a second shard. The second shard is associated with a second shard version attribute. The second shard and the second shard version attribute are provided as a second update within the data stream.

In another aspect of the present disclosure, a first shard including one or more messages and a first shard version attribute is received from a device. A current shard version is requested from the device. Based on a determination that the current shard version is consistent with the first shard version attribute, an operation is performed with respect to the first shard.

In another aspect of the present disclosure, a first shard including one or more messages and a first shard version attribute is received. A current shard version is requested. Based on a determination that the current shard version is consistent with the first shard version attribute, an operation is performed with respect to the first shard.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1A:
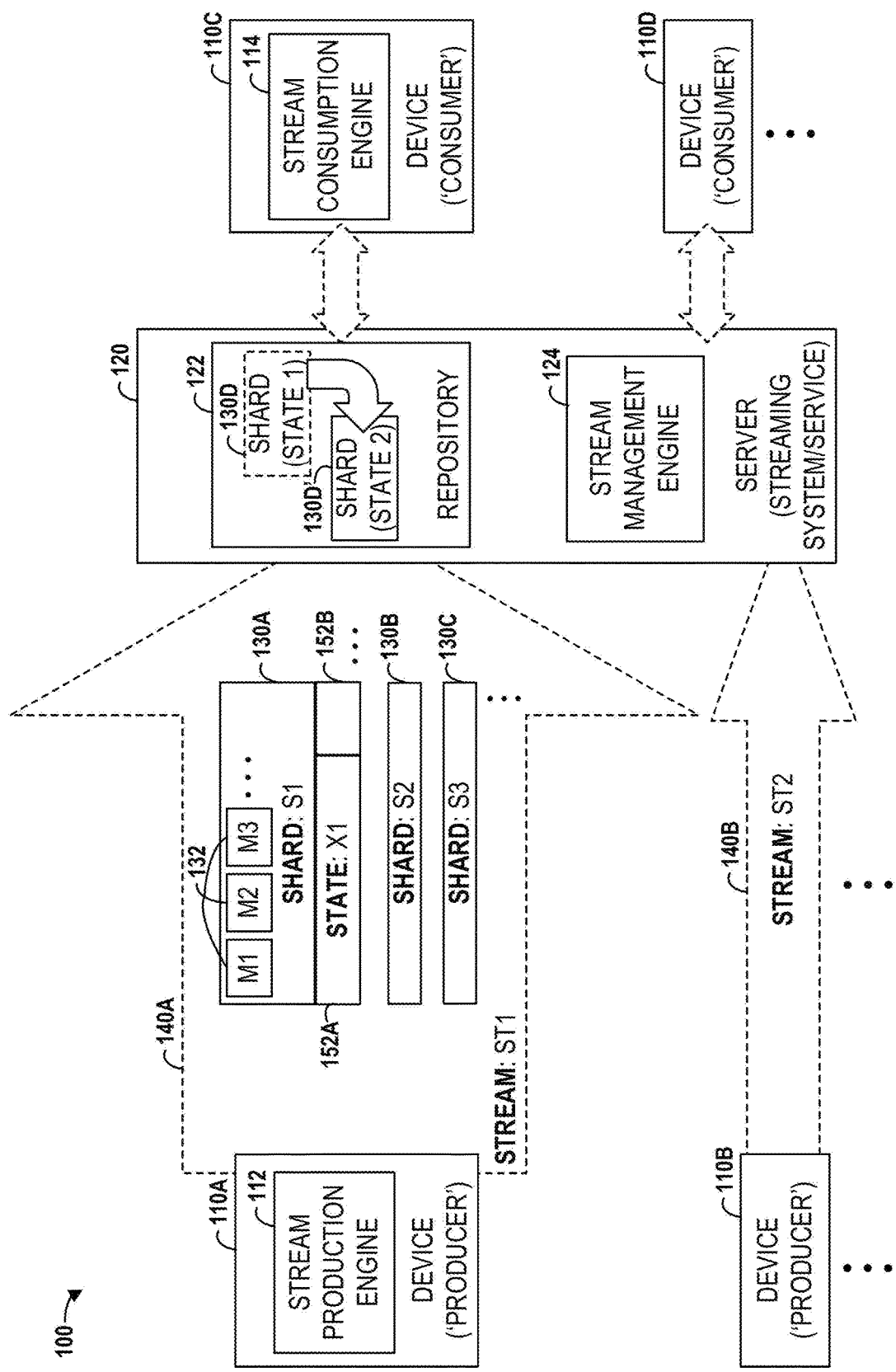
FIG. 1A illustrates an example system, in accordance with an example embodiment.

Aspects and implementations of the present disclosure are directed to stateless stream handling and resharding.

As described herein, various device(s), system(s), etc. can generate data, content, commands, etc., such as such as messages or events. In certain implementations, such messages, commands, events, etc. can be structured, formatted, provided and/or transmitted in various ways, such as a stream, feed, queue, etc. Examples of such device(s) (from which messages, events, etc., originate) include but are not limited to: computing devices, Internet of Things ('IoT') devices, sensors, systems, other devices, services, and/or functions, and/or any other element or source capable of generating, providing, and/or otherwise making accessible the messages, commands, events, data, etc., described herein. In various examples illustrated here, the referenced device(s) (from which a stream of messages, events, etc. can originate) may be referred to as "producer(s)."

As also described herein, various device(s), system(s), etc. can be configured to access, analyze, process, and/or perform various other operations on data, content, commands, etc., such as such as messages or events (e.g., stream(s), feed(s), etc. of messages, events, etc., originating from the producer(s) referenced above). Examples of such device(s) or system(s) (that process the referenced streams) include but are not limited to: computing devices, systems, services, and/or any other element capable of processing and/or otherwise performing operations with respect to the streams, messages, commands, events, data, etc., described herein. In various examples illustrated here, the referenced device(s) (that can process streams of messages, events, etc.) may be referred to as "consumer(s)."

Various modern systems may employ multiple producers and multiple consumers in various topologies or arrangements. Such streaming systems may, for example, be configured to ensure that all events, messages, etc., within a stream are handled (e.g., provided by a producer and/or processed by a consumer) at least once. In scenarios in which multiple producers and/or consumers are present, such streaming systems may be configured to provide certain messages, events, etc. multiple times, such as in the event of a malfunction, crash, failure, etc., at a producer. In such a scenario, various messages, events, etc., may be provided multiple times, and it may be necessary to identify and/or resolve such redundancy (e.g., by the consumer when processing the referenced messages, events, etc.).

It can therefore be appreciated that various inefficiencies are present in streaming systems or services configured to stream and/or process each event, message, etc., within a stream 'at least once.'

Accordingly, described herein are technologies that enable streaming systems/services to provide and/or process such events or messages once (e.g., 'exactly once) and avoid redundancies or inefficiencies even in scenarios in which a producer or consumer fails. In doing so, the described technologies maintain the resiliency of a streaming system and enable stream producers and consumers to recover from failures while ensuring 'exactly once' semantics. Additionally, the described technologies can enable conditional updates and stateless operations, as described herein.

It can therefore be appreciated that the described technologies are directed to and address specific technical challenges and longstanding deficiencies in multiple technical areas, including but not limited to content streaming, content delivery, and data processing. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

By way of illustration, FIG. 1A depicts an example system 100, in accordance with some implementations. As shown in FIG. 1A, system 100 can include devices such as device 110A and device 110B (also referred to herein as producer(s)'), as well as other systems, services, entities, etc., as described herein. Various devices can be connected to and/or otherwise communicate or transmit information, data, etc., to one another via various networks, connections, protocols, etc. (e.g., via the internet).

The referenced producers (e.g., device 110A as shown in FIG. 1A) can be, for example, a server computer, computing device, storage service (e.g., a "cloud" service), etc. which a stream of messages, events, etc. can originate. In certain implementations, such devices can include stream production engine 112.

Figure 6:
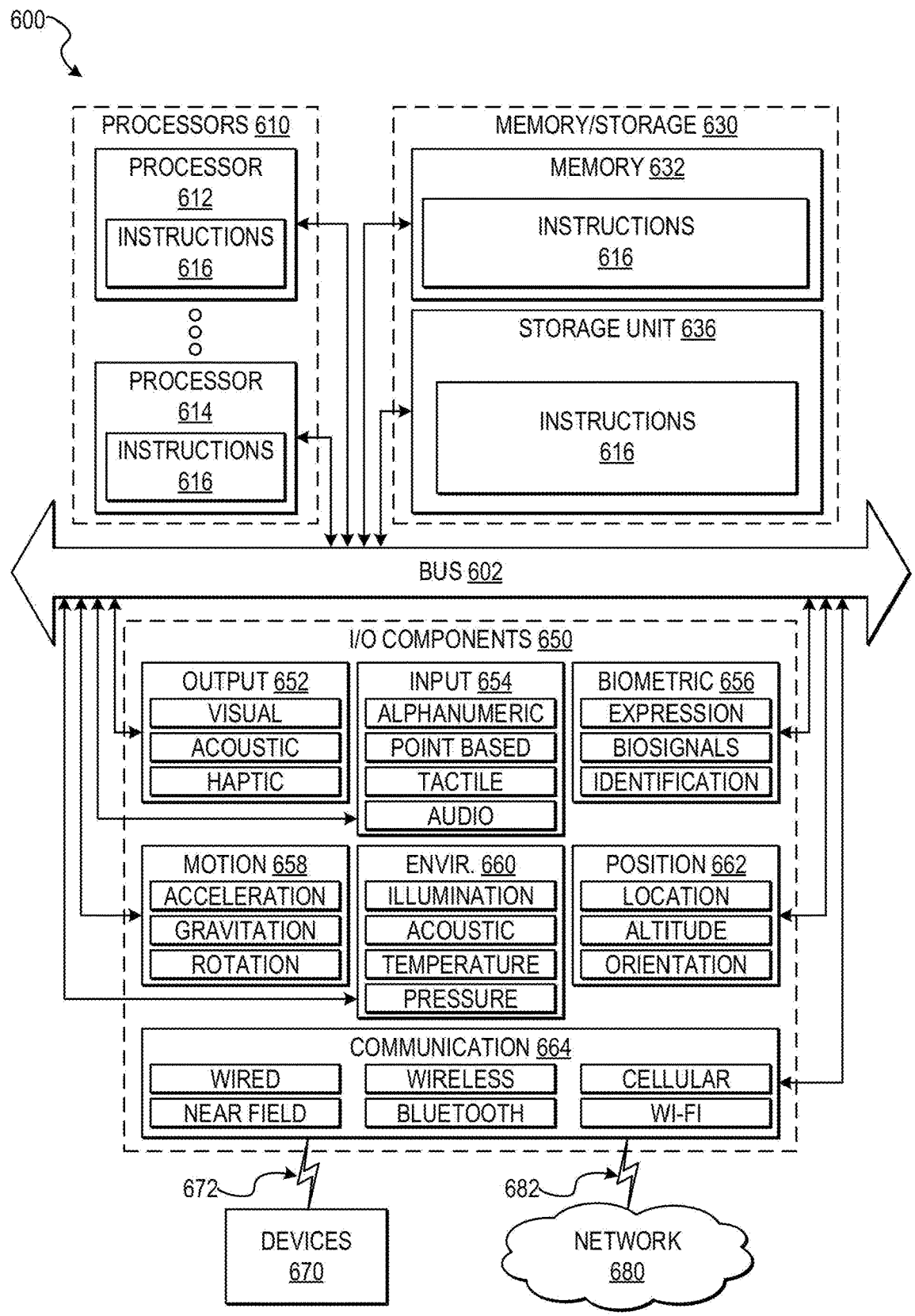
FIG. 6 is a block diagram illustrating components of a machine able to read instructions from a machine-readable medium and perform any of the methodologies discussed herein, according to an example embodiment.

Stream production engine 112 can be a program, module, or set of instructions that configures/enables a device (e.g., a producer such as device 110A as shown in FIG. 1A) to perform various operations such as are described herein. Such instructions, etc., can be stored in memory of the device (e.g. memory 630 as depicted in FIG. 6 and described below). One or more processor(s) of the device (e.g., processors 610 as depicted in FIG. 6 and described below) can execute such instruction(s). In doing so, the device can be configured to perform various operations, such as those described herein. For example, stream production engine 112 can configure the device to generate shard(s) and/or perform other operations as described herein.

As also shown in FIG. 1A, system 100 can also include devices such as device 110C and device 110D (also referred to herein as 'consumer(s)'). Such devices can be, for example, a server computer, computing device, services (e.g., a "cloud" service), etc. configured to access, analyze, process, and/or perform various other operations on messages or events (e.g., stream(s), feed(s), etc. originating from the producer(s) referenced above). In certain implementations, such devices can include stream consumption engine 114. Stream consumption engine 114 can be a program, module, or set of instructions that configures/enables a device (e.g., device 110C as shown in FIG. 1A) to perform various operations such as are described herein. For example, stream consumption engine 114 can configure the device to request and/or process messages, events, etc., such as those originating from 'producer' devices, as described herein.

Additionally, in certain implementations system 100 can also server 120. Server 120 can be, for example, a server computer, computing device, services (e.g., a "cloud" service), etc. configured to manage various aspects of a distributed streaming system (e.g., a system that incorporates multiple producers and/or consumers. In certain implementations, server 120 can include repository 122 and/or stream management engine 124. Repository 122 can be, for example, various storage resource(s) such as an object-oriented database, a relational database, memory, etc. with respect to which data (e.g., shards, messages, objects, etc., such as those referenced herein) can be retrieved and/or stored. Stream management engine 124 can be a program, module, or set of instructions that configures/enables server 120 to perform various operations such as are described herein. For example, stream management engine 124 can configure server 120 to update (and/or perform various other operations or transformations on) a record, shard, message, object etc. stored in repository 122, as described herein.

Further aspects and features of system 100 are described in more detail below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2A:
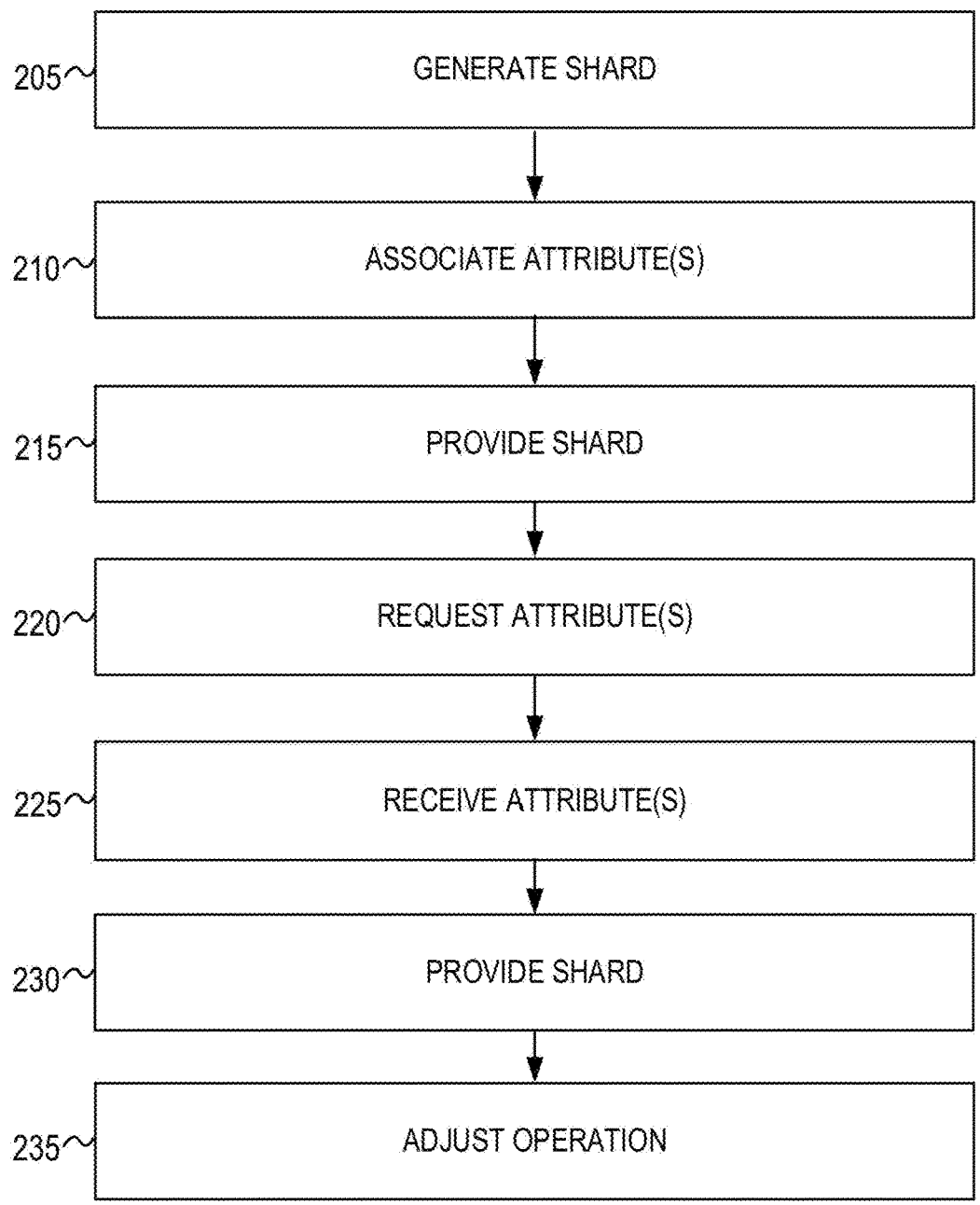
FIG. 2A is a flow chart illustrating a method, in accordance with an example embodiment, for stateless stream handling and resharding.

FIG. 2A is a flow chart illustrating a method 200, according to an example embodiment, for stateless stream handling and resharding. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1A (including but not limited to device 110A and/or stream production engine 112), while in some other implementations, the one or more blocks of FIG. 2A can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 205, a first shard is generated. In certain implementations, such a shard can be an object or partition (e.g., from a larger database or object) and can include one or more messages, events, records, etc., as described herein. For example, as shown in FIG. 1A, shard 'S1' (130A) can be generated by producer 110A (e.g., by stream production engine 112). As shown in FIG. 1A, shard 130A can include messages 132 (e.g., messages 'M1,' 'M2,' 'M3,' etc.).

At operation 210, the first shard (e.g., as generated at operation 205) is associated with an attribute. In certain implementations, such an attribute can be a state attribute 152A, such as state attribute ("STATE") 'X1' as shown in FIG. 1A. Such a state attribute can reflect, for example, various aspects of the state of the producer. Examples of such a state can include but are not limited to a quantity or value corresponding to the number of messages being produced by the producer (e.g., per second), various aspects of data transformation being performed by the producer, and/or other state(s) reflecting the status or operation(s) of the producer.

In certain scenarios, storing/associating a state attribute with a shard can enable a producer that fails or malfunctions to be reinitialized and continue providing shards, messages, records, etc., within a stream. For example, as described herein, in a scenario in which a producer fails and is reinitialized, the producer can request (e.g., from server 120 and/or repository 122) the state attribute (e.g., from a shard associated with the same producer and provided to/received by server 120). In response, the producer can receive a state attribute/identifier that reflects, for example, the state of the producer (e.g., when the most recently received shard was provided). The producer can then reinitialize and continue providing shards, messages, etc. based on such received state (rather than, for example, providing redundant copies of shards/records that have been previously received by the streaming system). It can be appreciated that such a configuration can enable the producer to operate in a stateless manner.

Additionally, as shown in FIG. 1A, in certain implementations the described technologies can further assign or associate additional attributes (e.g., attribute 152B) to the referenced shards, messages, etc. Such attributes can, for example, enable various entities, services, systems, etc. (e.g., server 120) to collect, monitor, and/or generate various metrics, statistics, etc., that reelect aspects of the operation of a producer. By way of illustration, such attributes (which can be associated to a shard, e.g., by the producer from which it originates) can reflect the number of messages, events, etc. pushed by the producer, number of records updated, messages since a last push operation, various latencies associated with operations of the producer (e.g., push latency), etc. In doing so, the streaming system can monitor the operation of various producer(s), and can further adjust various other operations based on the referenced metrics, statistics, etc., as described herein.

Additionally, in certain implementations such a state attribute can reflect an importance and/or location of one or more of the messages (e.g., within the associated shard/stream). By way of illustration, in a scenario in which messages, data, etc., being provided/pushed by the producer into the stream has a structured format, the described technologies (e.g., stream production engine 112) can enable various operations/transformations. For example, an attribute (e.g., attribute 152B as shown in FIG. 1A) and/or other such property of a shard (e.g., shard 'S1') can be assigned/updated based on message(s), data, etc., within the shard. By way of illustration, such attribute(s), propertie(s), etc. can be used for statistics (e.g., reflecting message properties such as message types), alerts (e.g., based on content of a message within the stream), location markers (e.g., reflecting location of certain messages within a shard), etc.

By way of further illustration, it can be appreciated that certain messages provided/pushed by a producer may be of particular significance, importance, etc. (e.g., messages containing certain content). Accordingly, it can be advantageous to configure the described technologies to enable such message(s) to be easily accessed, identified, etc. In certain implementations, when generating a shard that includes message(s) of particular importance (e.g., messages containing certain types of content), an attribute 152B or other such property can be associated with the shard, reflecting that it contains an important message. Upon receiving such a shard (with the referenced attribute/property), streaming system 120 and/or consumer 110C can prioritize the processing, analysis, etc. of such a shard/message (and/or perform other operations). By way of further example, the referenced attribute 152B or property can reflect the location (e.g., within the shard) of such important, significant, etc. message(s). In doing so, the state/attributes of the shard can reflect content within its messages and can further enable operations to be performed on such messages (e.g., in a prioritized manner).

Additionally, in certain implementations, the referenced attribute 152B (which can be used to adjust/control operation of the producer) can include/reflect a token, such as may be assigned based on a processing capacity of a streaming system. Such a token may be assigned (e.g., to a shard, message, etc.) based on a processing capacity of a streaming system. In certain implementations, such a token can be assigned by the streaming system 120 and/or by a consumer (e.g., consumer 110C) of the stream. For example, the referenced tokens can be used to implement flow control operations which can, for example, adjust operation of the producer (e.g., in scenarios in which shards, messages, etc., are being provided too quickly). Further aspects of the referenced flow control operations are described below, e.g., at operation 235.

In other implementations, the referenced attribute can include or reflect an identifier such as a sequence identifier. Such a sequence identifier can reflect the position of the associated shard (and/or message(s)) within a sequence. By way of illustration, a time/date stamp (reflecting, for example, the time/date the associated shard, message(s), etc., was/were received, created, and/or provided) can be used as a sequence identifier. In doing so, the relative position of a certain shard can be determined. For example, a sequence identifier associated with shard 'S2' (as shown in FIG. 1A) can reflect that such a shard was received, created, and/or provided after shard 'S1' and before shard 'S3'.

It should be noted that in scenarios in which multiple producers are present (e.g., as shown in FIG. 1A), the referenced attribute(s) can further include a field, identifier, etc., that reflects the producer from which the associated shard/message(s) originated. Accordingly, in the scenario depicted in FIG. 1A, shard(s) originating from producer 110A can be associated with an attribute reflecting the identity of the producer and a timestamp, while shard(s) originating from producer 110B can be associated with corresponding identifier(s) also reflecting the identity of that producer (as well as a timestamp). Doing so can, for example, ensure consistent processing of multiple shards originating from multiple producers.

At operation 215, the first shard (e.g., as generated at operation 205) is provided. For example, in the scenario depicted in FIG. 1A, producer 110A and/or stream production engine 112 can provide a shard (e.g., shard 'S1') into stream 140A (e.g., via a 'push' operation).

In certain implementations, such a shard (and an associated attribute) is provided (e.g., 'pushed') as an update (e.g., within a data stream). In certain implementations, such an update can be an atomic update and/or a conditional update (e.g., within a data stream, such as an update that transforms shard 130D to shard 130D', as shown in FIG. 1A). For example, an atomic update can include multiple updates, operations, etc., that are to be performed collectively (e.g., on repository 122). In doing so, either all of the updates, operations, etc., are to be performed or the atomic update is rejected and none of the updates, operations, etc., are to be performed (e.g., in a scenario in which certain updates cannot be completed). By way of further example, the providing of such a shard can be conditioned, for example, on it being provided to and/or received by a streaming system (e.g., server 120) for the first time. Accordingly, upon determining, for example, that a shard has already been provided/received (e.g., based on attributes/sequence identifier(s) of the received shard and/or other shards), the referenced update operation can be canceled. In other implementations, shard(s) that are received out of order can be handled in other ways, as described herein.

By way of further illustration, in a scenario in which a producer (e.g., device 110A) malfunctions or fails while providing messages, shards, etc., when such a producer resumes operation, attributes (e.g., sequence identifiers) of those messages/shards that have been previously provided to the stream can be used to determine that such shards/messages do not need to be provided/pushed again. Doing so can enable shards, messages, records, etc., to be provided exactly once by a producer to a streaming system, and can eliminate the need for redundant records/shards, even in scenarios in which such producer fails.

At operation 220, an attribute such as a state attribute is requested (e.g., from the first shard). For example, in a scenario in which producer 110A malfunctions, fails, etc., when reinitializing, producer 110A (and/or stream production engine 112) can request a state attribute (e.g., from stream 140A, server 120 and/or repository 122). Doing so can enable producer 110A to reinitialize and continue providing shards, messages, etc., that have not previously been 'pushed' (e.g., to stream 140A, server 120, and/or repository 122), without providing or pushing redundant shard(s)/message(s) (which have already been pushed/received).

By way of further illustration, in certain implementations the referenced attribute (being requested) can include or reflect a sequence identifier (e.g., from the first shard). For example, in a scenario in which producer 110A malfunctions, fails, etc., when reinitializing, producer 110A (and/or stream production engine 112) can request a sequence identifier (e.g., from stream 140A, server 120 and/or repository 122). Doing so can enable producer 110A to reinitialize and continue providing shards, messages, etc., that have not previously been 'pushed' (e.g., to stream 140A, server 120, and/or repository 122), without providing or pushing redundant shard(s)/message(s) (which have already been pushed/received).

At operation 225, an attribute such as a state attribute is received (e.g., in response to the request at operation 220). In certain implementations, such a state attribute can be received by producer 110A and/or stream production engine 112, as shown in FIG. 1A. Additionally, in certain implementations such an attribute can be received in response to a request (e.g., the request provided at operation 220). As described herein, such an attribute can reflect a state of the producer when such shard, etc., was provided/pushed.

By way of illustration, in a scenario in which producer 110A (as shown in FIG. 1A) fails or malfunctions after pushing shard 'S1,' upon reinitializing, the producer can request the state attribute 152A associated with such a shard (e.g., from stream 140A and/or server 120). Upon receiving the associated state attribute (here, 'X1'), producer 110A can determine its state (e.g., at the time the shard, etc., was pushed) and can thus reinitialize operation to such a state (and continue pushing subsequent shard(s)). It can be appreciated that such a configuration can enable the producer to operate in a stateless manner.

By way of further illustration, in certain implementations a sequence identifier can be received. In certain implementations, such a sequence identifier can be received by producer 110A and/or stream production engine 112, as shown in FIG. 1A. Additionally, in certain implementations such a sequence identifier can be received in response to a request (e.g., the request provided at operation 220). As described herein, such a sequence identifier can reflect the relative position of a shard (and/or message(s)) within a sequence.

By way of illustration, in a scenario in which producer 110A (as shown in FIG. 1A) fails or malfunctions after pushing shard 'S1,' upon reinitializing, the producer can request the sequence identifier associated with such a shard (e.g., from stream 140A and/or server 120). Upon receiving the associated sequence identifier, producer 110A can determine that shard 'S1' has been successfully pushed, and can reinitialize operation to continue pushing subsequent shard(s). Doing so can enable such shards, messages, records, etc., to be provided and processed 'exactly once,' without needing redundant operations and/or multiple copies to ensure all messages are provided/processed.

At operation 230, a second shard is provided. In certain implementations, such a shard can be provided within a data stream based on the received state attribute(s) (e.g., as received at operation 225). By way of illustration, in a scenario in which producer 110A (as shown in FIG. 1A) fails or malfunctions after pushing shard 'S1,' upon reinitializing, the producer can request (e.g., at operation 220) the state attribute 152A (e.g., a sequence identifier and/or another attribute) associated with such a shard (e.g., from stream 140A and/or server 120). Upon receiving (e.g., at operation 225) the associated state attribute (here, 'X1'), producer 110A can determine that shard 'S1' has been successfully pushed, and can reinitialize operation to continue pushing other/subsequent shard(s) (e.g., shard 'S2'). Doing so can enable such shards, messages, records, etc., to be provided and processed 'exactly once,' without needing redundant operations and/or multiple copies to ensure all messages are provided/processed.

By way of further example, the referenced second shard can be provided within a data stream based on a received attribute (e.g., a state attribute, such as is received at operation 225). By way of illustration, in a scenario in which producer 110A (as shown in FIG. 1A) fails or malfunctions after pushing shard 'S1,' upon reinitializing, the producer can request the state attribute 152A associated with such a shard (e.g., from stream 140A and/or server 120). Upon receiving the associated state attribute (here, 'X1'), producer 110A can determine its state (e.g., at the time the shard, etc., was pushed) and can reinitialize operation to such a state (and continue pushing other/subsequent shard(s)). As described herein, such a configuration can enable the producer to operate in a stateless manner.

At operation 235, an operation of a message production source can be adjusted. That is, as described herein, the referenced shard(s) can be associated with various attribute(s) (e.g., attribute 152B as shown in FIG. 1A). As also described herein, in certain implementations, producer 110A can request and/or receive certain attributes (based upon which the producer can, for example, determine which shards have/have not been provided within a stream). Accordingly, in certain implementations, such attribute(s) can also be used to control or adjust operation of the producer. For example, in certain implementations server 120 (e.g., a streaming system/service) can associate, assign, or update certain attribute(s) with respect to a shard (e.g., as stored in repository 122). Upon receiving a request from the producer (e.g., as described above at operation 220), such control attribute(s) can be provided to the producer. Upon receiving such attribute(s) (e.g., as described at operation 225), the producer can adjust its operation accordingly. Additionally, in certain implementations, such operation(s) can be adjusted based on a received attribute (e.g., as received at operation 225).

By way of illustration, in one scenario such an attribute 152B can reflect whether the producer is (or is not) to remain active. Such an attribute can be dictated or provided by another entity (e.g., streaming system 120 and/or another source). Accordingly, upon receiving a shard (e.g., shard 'S1' as shown in FIG. 1A) and storing/maintaining such a shard (e.g., within repository 122), server 120 can associate attribute 152B to the shard which can reflect, for example, that producer 110A is to be disabled. Upon receiving a request (e.g., from producer 110A) for such attribute(s), the 'disable' attribute can be returned (and received by producer 110A). Producer 110A can then adjust its operation (here, disabling itself from providing subsequent shards, messages, etc.) and/or perform corresponding operations. In doing so, push/pull operations initiated by the described producer can be used to enable additional functionality.

Additionally, in certain implementations, the referenced attribute 152B (which can be used to adjust/control operation of the producer) can include/reflect a token. Such a token may be assigned (e.g., to a shard, message, etc.) based on a processing capacity of a streaming system. In certain implementations, such a token can be assigned by the streaming system 120 and/or by a consumer (e.g., consumer 110C) of the stream. For example, the referenced tokens can be used to implement flow control operations which can, for example, adjust operation of the producer (e.g., in scenarios in which shards, messages, etc., are being provided too quickly).

By way of illustration, system 120 (and/or a consumer) can assign a token to a shard, e.g., as attribute 152B as shown in FIG. 1A. The system can be configured to assign a certain number of tokens (e.g., 1000 tokens per second to a stream originating from a particular producer) and may be further configured to only store/maintain those shards being assigned a token (e.g., in repository 122). The system 120 can also be configured to adjust (e.g., increase or decrease) the number of tokens (e.g., in scenarios in which it may be advantageous for system and/or consumer(s) to increase/decrease the rate at which messages, shards, etc., are being received from the stream). While those shards, messages, etc., can be stored/maintained (e.g., in repository 122), those shards, messages, etc. not assigned a token may not be stored/maintained (until they are assigned a token). In doing so, the flow of shards, messages, etc., from the producer can be further controlled using push/pull operations initiated by the producer (without a separate control channel to control operation).

Figure 2B:
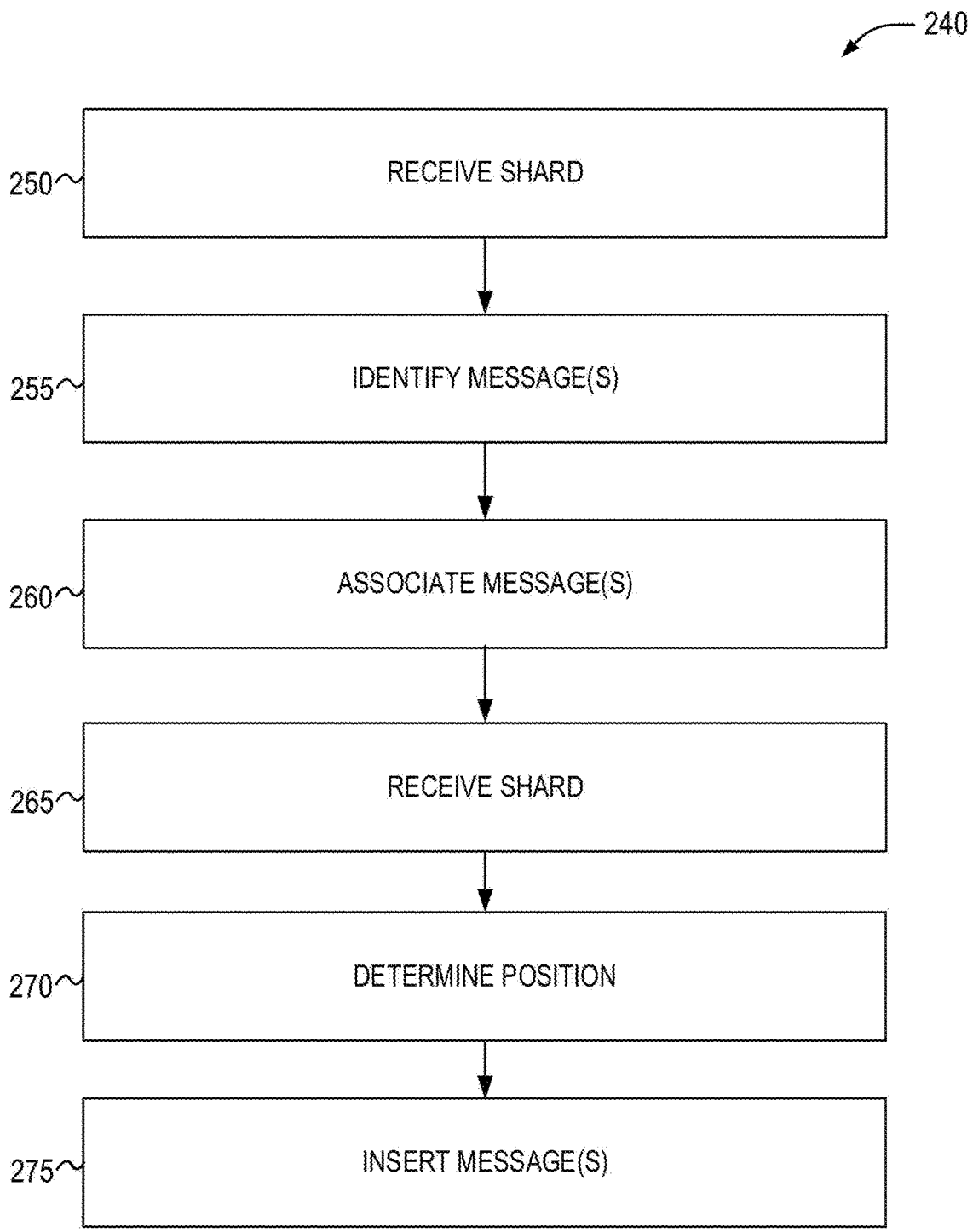
FIG. 2B is a flow chart illustrating a method, in accordance with an example embodiment, for stateless stream handling and resharding.

FIG. 2B is a flow chart illustrating a method 240, according to an example embodiment, for stateless stream handling and resharding. The method is performed by processing logic that can comprise hardware (circuitry, dedicated logic, etc.), software (such as is run on a computing device such as those described herein), or a combination of both. In one implementation, the method 240 is performed by one or more elements depicted and/or described in relation to FIG. 1A (including but not limited to server 120 and/or stream management engine 124), while in some other implementations, the one or more blocks of FIG. 2B can be performed by another machine or machines.

At operation 250, a first shard is received, e.g., within a first stream. In certain implementations, such a shard can include one or more messages, events, records, etc., as described herein (e.g., shard 'S1' including include messages 132, as shown in FIG. 1A). Additionally, in certain implementations, such a shard can include or reflect a state attribute. Such a state attribute 152A can reflect, for example, aspects of the state of the producer, such as the number of messages being produced by the producer (e.g., per second), aspects of data transformation being performed by the producer, and/or other state(s) reflecting the status or operation(s) of the producer.

In other implementations, such a state attribute can reflect the position of the associated shard (and/or message(s)) within a sequence. By way of illustration, such a state attribute can include or reflect a time/date stamp (reflecting, for example, the time/date the associated shard, message(s), etc., was/were received, created, and/or provided). In doing so, the relative position of a certain shard can be determined.

At operation 255, a message is identified (e.g., within the shard received at operation 250). In certain implementations such a message (or messages) can be one that is inconsistent with a state attribute associated with the shard within which the message was received. For example, such a message can be identified as being received out of sequence with one or more other messages within the first shard. For example, in the scenario depicted in FIG. 1A, message 'M2' can be determined to have been received out of order (e.g., with respect to other message(s) within the shard). In certain implementations, such a determination can be computed based on the state attribute 152A associated with the shard. For example, the referenced state attribute can reflect that the shard includes messages received/provided during a certain period of time, while the message ('M2') may reflect a message from another period of time.

At operation 260, the message (e.g., as identified at operation 255) is associated as an attribute of the first shard. For example, an attribute 152B of the shard (e.g., shard 'S1') can be populated with the content, data, etc. of such a message (which has been determined not to belong within the sequence of other message(s) within the shard. Such an attribute can function as a queue for such message(s) (e.g., those received out-of-sequence), as described herein.

At operation 265, a second shard is received. In certain implementations, such a shard can include or reflect another state attribute. Additionally, in certain implementations such a second shard can be received within the first stream (e.g., the stream within which the first shard was received at operation 250) and/or within a second stream (which may originate from another producer). By way of illustration, additional shard(s) (e.g., shard 'S2,' S3,' etc.) can be received, e.g., from the same producer and/or from other producer(s).

At operation 270, a position of the message within the second shard is determined. In certain implementations, such position can be determined (e.g., based on the second state attribute). For example, upon receiving other shard(s), it can be further determined whether the identified message(s) (which were received out-of-order within the first shard) are correctly positioned within the other shard(s). As described herein, the correct position of such message(s) can be determined based on the respective state attribute(s) of the received shard(s).

At operation 275, the message can be inserted into the second shard (e.g., based on the determining). For example, in the scenario depicted in FIG. 1A, upon determining that the correct position of message 'M2' is within shard 'S2,' stream management engine 124 can insert the message into the appropriate shard. It can be appreciated that doing so can, for example, enable multiple streams to be processed together, even in scenarios in which they may not be perfectly aligned.

Additionally, in certain implementations the described technologies can be configured to process the described streams, shards, messages, etc., in order to identify gaps within the referenced data/content. For example, in scenarios in which data pushed into a shard is expected to be sorted and/or identified using various record identifiers, etc. gaps within such data (reflecting, for example, missing records) can be identified and/or recorded/saved. In certain implementations, such gaps can be identified based on the described state attribute(s) which can reflect the position of a shard, message, etc., e.g., within a sequence. Upon identifying such a gap, various alerts can be initiated/provided (e.g., to attempt to locate the missing records, to highlight such a deficiency to an administrator, etc.).

Figure 3:
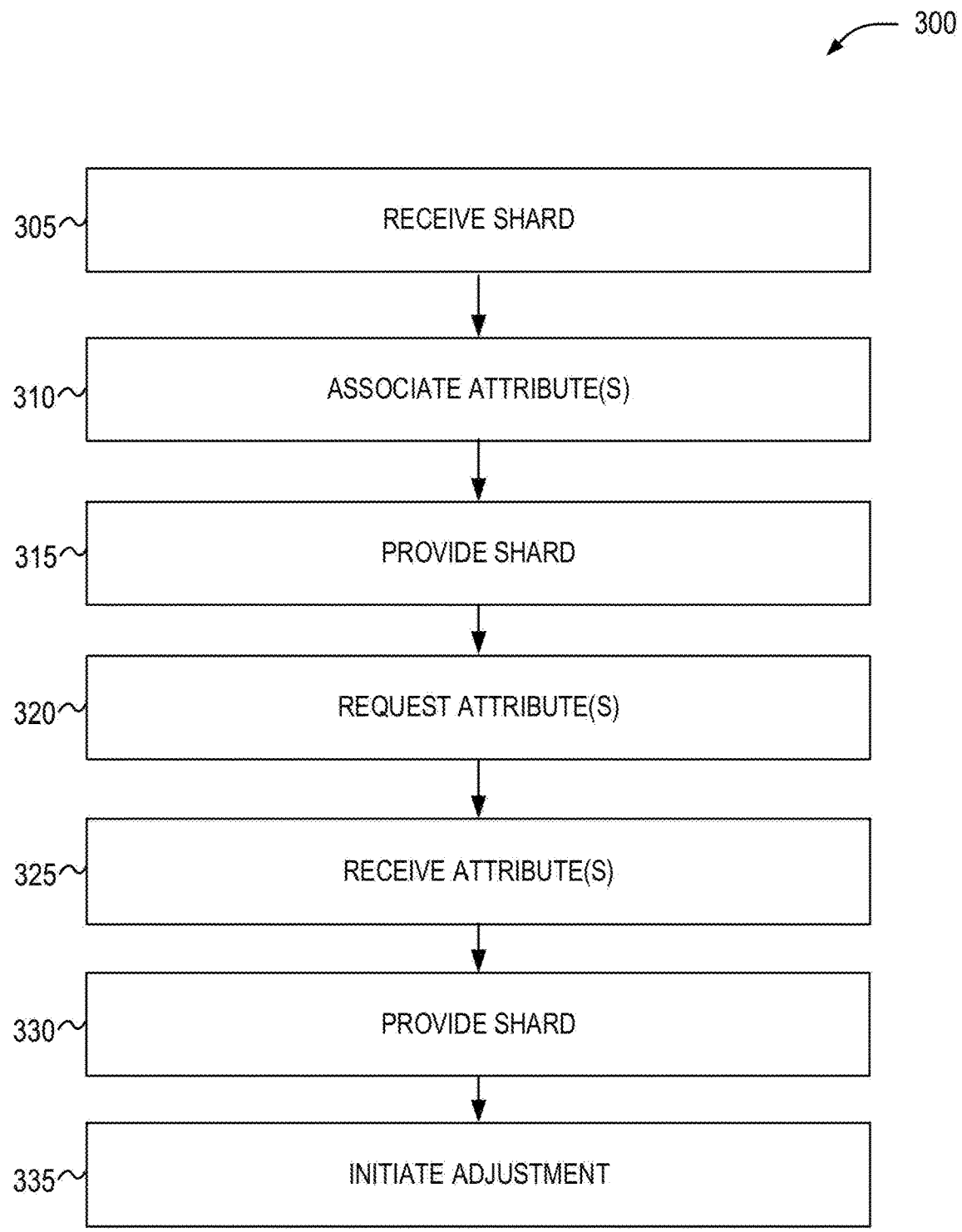
FIG. 3 is a flow chart illustrating a method, in accordance with an example embodiment, for stateless stream handling and resharding.

FIG. 3A is a flow chart illustrating a method 300, according to an example embodiment, for stateless stream handling and resharding. The method is performed by processing logic that can comprise hardware (circuitry, dedicated logic, etc.), software (such as is run on a computing device such as those described herein), or a combination of both. In one implementation, the method 300 is performed by one or more elements depicted and/or described in relation to FIG. 1A (including but not limited to device 110C and/or stream consumption engine 114), while in some other implementations, the one or more blocks of FIG. 3 can be performed by another machine or machines.

Figure 1B:
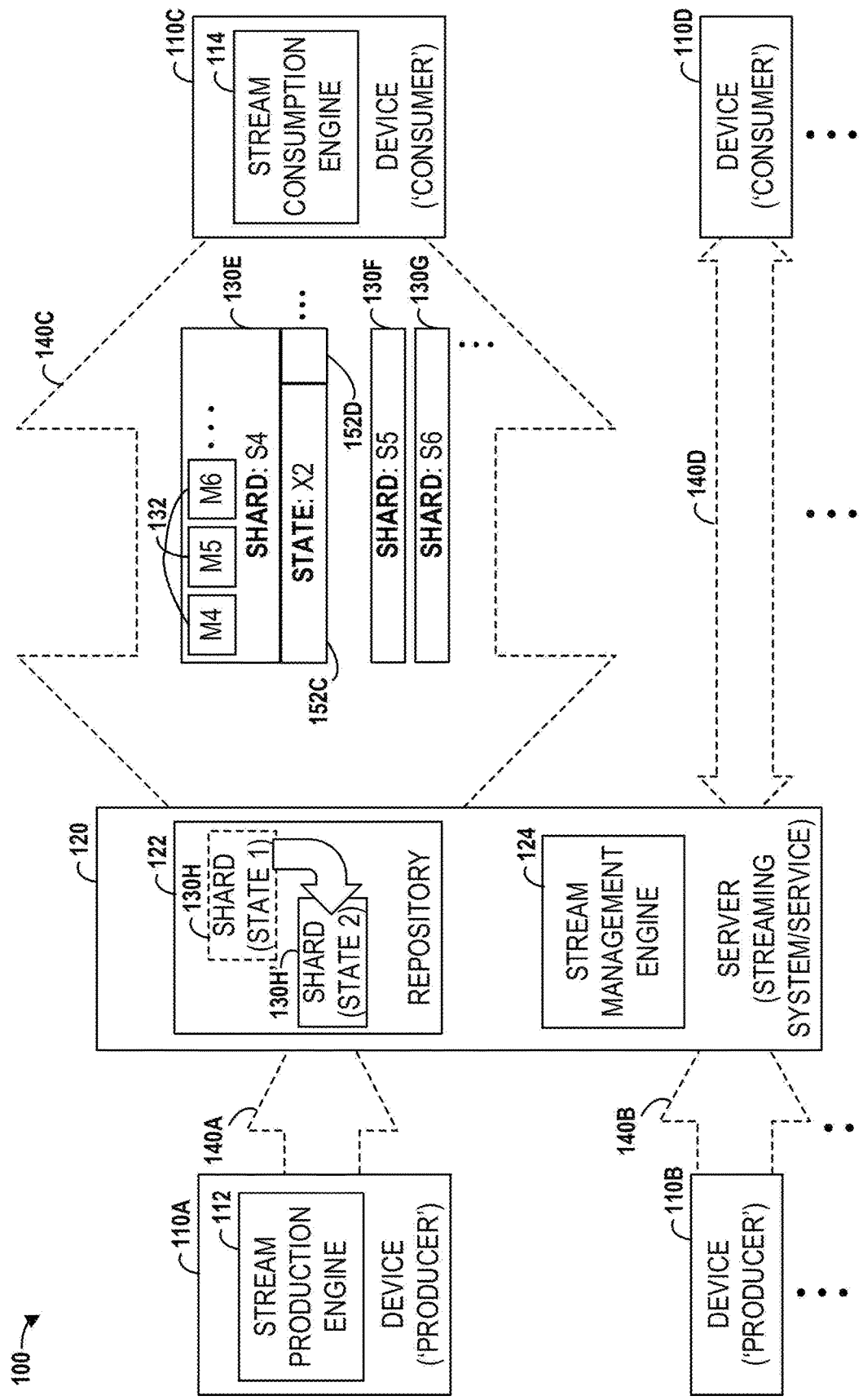
FIG. 1B illustrates an example system, in accordance with an example embodiment.

At operation 305, a first shard is received (e.g., from server 120 and/or producer 110A). In certain implementations, such a shard can include one or more messages, events, records, etc., as described herein. For example, as shown in FIG. 1B, shard 'S4' (130E) can be received from server 120. As noted, in certain implementations such a shard may originate at producer 110A. As shown in FIG. 1B, shard 130E can include messages 132 (e.g., messages 'M4', 'M5,' 'M6,' etc.).

At operation 310, the first shard (e.g., as received at operation 305) is associated with an attribute. In certain implementations, such an attribute can be a state attribute 152C—such as state attribute ("STATE") 'X2,' as shown in FIG. 1B. Such a state attribute can reflect, for example, various aspects of the state of the consumer. Examples of such a state can include but are not limited to a quantity or value corresponding to the number of messages being pulled, received and/or processed by the consumer (e.g., per second), various aspects of data transformation being performed by the consumer, and/or other state(s) reflecting the status or operation(s) of the consumer.

In certain scenarios, storing/associating a state attribute with a shard can enable a consumer that fails or malfunctions to be reinitialized and continue pulling, requesting and/or processing shards, messages, records, etc., within a stream. For example, as described herein, in a scenario in which a consumer fails and is reinitialized, the consumer can request (e.g., from server 120 and/or repository 122) the state attribute (e.g., from a shard associated with the same consumer and provided to/received by server 120). In response, the consumer can receive a state attribute that reflects, for example, the state of the consumer (e.g., when the most recently received shard was provided or processed). The consumer can then reinitialize and continue pulling or processing shards, messages, etc. based on such received state (rather than, for example, pulling or processing redundant copies of shards/records that have already been received, processed and/or provided to the streaming system). It can be appreciated that such a configuration can enable the consumer to operate in a stateless manner.

Additionally, as shown in FIG. 1B, in certain implementations the described technologies can further assign or associate additional attributes 152D to the referenced shards, messages, etc. Such attributes can, for example, enable various entities, services, systems, etc. (e.g., server 120) to collect, monitor, and/or generate various metrics, statistics, etc., that reelect aspects of the operation of a consumer. By way of illustration, such attributes (which can be associated to a shard, e.g., by the consumer from which it is received) can reflect the number of messages, events, etc. pulled by the consumer, number of records updated, messages since a last pull operation, various latencies associated with operations of the consumer (e.g., pull latency), etc. In doing so, the streaming system can monitor the operation of various consumer(s), and can further adjust various other operations based on the referenced metrics, statistics, etc., as described herein.

Additionally, in certain implementations such a state attribute can reflect an importance and/or location of one or more of the messages (e.g., within the associated shard/ stream). By way of illustration, in a scenario in which messages, data, etc., being received, pulled, and/or processed by the consumer have a structured format, the described technologies (e.g., stream consumption engine 114) can enable various operations/transformations. For example, an attribute (e.g., attribute 152D as shown in FIG. 1B) and/or other such property of a shard (e.g., shard 'S4') can be assigned/updated based on message(s), data, etc., within the shard. By way of illustration, such attribute(s), propertie(s), etc. can be used for statistics (e.g., reflecting message properties such as message types), alerts (e.g., based on content of a message within the stream), location markers (e.g., reflecting location of certain messages within a shard), etc.

By way of further illustration, it can be appreciated that certain messages received, pulled, and/or processed by a consumer may be of particular significance, importance, etc. (e.g., messages containing content that may necessitate immediate action). Accordingly, it can be advantageous to configure the described technologies to enable such message(s) to be easily accessed, identified, etc. In certain implementations, when receiving, pulling, and/or processing a shard that includes message(s) of particular importance (e.g., messages containing certain types of content), an attribute 152D or other such property can be associated with the shard, reflecting that it contains an important message. Upon receiving such a shard (with the referenced attribute/property), streaming system 120 can prioritize the processing, analysis, etc. of such a shard/message (and/or perform other operations). By way of further example, the referenced attribute 152D or property can reflect the location (e.g., within the shard) of such important, significant, etc. message(s). In doing so, the state/attributes of the shard can reflect content within its messages and can further enable operations to be performed on such messages (e.g., in a prioritized manner).

Additionally, in certain implementations, the referenced attribute 152D (which can be used to adjust/control operation of a producer) can include/reflect a token, such as may be assigned based on a processing capacity of a streaming system. Such a token may be assigned (e.g., to a shard, message, etc.) based on a processing capacity of a streaming system. In certain implementations, such a token can be assigned by the streaming system 120 and/or by a consumer (e.g., consumer 110C) of the stream. For example, the referenced tokens can be used to implement flow control operations which can, for example, adjust operation of the producer (e.g., in scenarios in which shards, messages, etc., are being provided too quickly). Further aspects of the referenced flow control operations are described below, e.g., at operation 350.

In other implementations, the referenced attribute can include or reflect an identifier such as a sequence identifier. Such a sequence identifier can reflect the position of the associated shard (and/or message(s)) within a sequence. By way of illustration, a time/date stamp (reflecting, for example, the time/date the associated shard, message(s), etc., was/were received and/or processed) can be used as a sequence identifier. In doing so, the relative position of a certain shard can be determined. For example, a sequence identifier associated with shard 'S5' (as shown in FIG. 1B) can reflect that such a shard was received and/or processed after shard 'S4' and before shard 'S6' (within stream 140C).

It should be noted that in scenarios in which multiple consumers are present (e.g., as shown in FIG. 1B), the referenced sequence identifier(s) can further include a field, property, etc., that reflects the consumer that pulled, processed, etc. the associated shard/message(s). Accordingly, in the scenario depicted in FIG. 1B, shard(s) received/processed by consumer 110C can be associated with an attribute reflecting the identity of the consumer and a timestamp, while shard(s) received/processed by consumer 110D can be associated with corresponding attribute(s) also reflecting the identity of that producer (as well as a timestamp). Doing so can, for example, ensure consistent processing of multiple shards across multiple consumers.

At operation 315, the first shard (e.g., as received at operation 305) is provided. For example, in the scenario depicted in FIG. 1B, consumer 110C and/or stream consumption engine 114 can provide a shard (e.g., shard 'S4') into stream 140C (e.g., via a 'push' operation).

In certain implementations, such a shard (and an associated state attribute) is provided (e.g., 'pushed') as an update (e.g., within a data stream). In certain implementations, such an update can be an atomic update and/or a conditional update (e.g., within a data stream, such as an update that transforms shard 130H to shard 130H', as shown in FIG. 1B). For example, an atomic update can include multiple updates, operations, etc., that are to be performed collectively. In doing so, either all of the updates, operations, etc., are to be performed or the atomic update is rejected and none of the updates, operations, etc., are to be performed (e.g., in a scenario in which certain updates cannot be completed). By way of further example, the providing of such a shard can be conditioned, for example, on it being provided to and/or received by a streaming system (e.g., server 120) for the first time. Accordingly, upon determining, for example, that other shards have already been provided/received (e.g., based on attributes/sequence identifier(s) of the received shard and/or other shards), the referenced update operation can be canceled. In other implementations, shard(s) that are received out of order can be handled in other ways, as described herein.

By way of further illustration, in a scenario in which a consumer (e.g., device 110C) malfunctions or fails while providing messages, shards, etc., when such a consumer resumes operation, the attribute(s) (e.g., sequence identifiers) of those messages/shards that have been previously provided to the stream can be used to determine that such shards/messages do not need to be provided/pushed again. Doing so can enable shards, messages, records, etc., to be provided exactly once by a consumer to a streaming system, and can eliminate the need for redundant records/shards, even in scenarios in which such consumer fails.

At operation 320, an attribute such as a state attribute is requested (e.g., from the first shard). For example, in a scenario in which consumer 110C malfunctions, fails, etc., when reinitializing, consumer 110C (and/or stream consumption engine 114) can request a state attribute (e.g., from stream 140C, server 120 and/or repository 122). Doing so can enable consumer 110C to reinitialize and continue pulling or processing shards, messages, etc., that have not previously been handled (e.g., to stream 140C, server 120, and/or repository 122), without pulling or processing redundant shard(s)/message(s) (which have already been handled).

By way of further illustration, in certain implementations the referenced attribute (being requested) can include or reflect a sequence identifier (e.g., from the first shard). For example, in a scenario in which consumer 110C malfunctions, fails, etc., when reinitializing, consumer 110C (and/or stream consumption engine 114) can request a sequence identifier (e.g., from stream 140C, server 120 and/or repository 122). Doing so can enable consumer 110C to reinitialize and continue providing shards, messages, etc., that have not previously been 'pushed' (e.g., to stream 140C, server 120, and/or repository 122), without providing or pushing redundant shard(s)/message(s) (which have already been pushed/received).

At operation 325, an attribute such as a state attribute is received (e.g., in response to the request at operation 320). In certain implementations, such a state attribute can be received by consumer 110C and/or stream consumption engine 114, as shown in FIG. 1B. Additionally, in certain implementations such an attribute can be received in response to a request (e.g., the request provided at operation 320). As described herein, such an attribute can reflect a state of the consumer when such shard, etc., was pulled/processed.

By way of illustration, in a scenario in which consumer 110C (as shown in FIG. 1B) fails or malfunctions after pulling or processing shard 'S4,' upon reinitializing, the consumer can request the state attribute 152C associated with such a shard (e.g., from stream 140C and/or server 120). Upon receiving the associated state attribute (here, 'X2'), consumer 110C can determine its state (e.g., at the time the shard, etc., was pulled or processed) and can thus reinitialize operation to such a state (and continue pulling/processing subsequent shard(s)). It can be appreciated that such a configuration can enable the consumer to operate in a stateless manner.

By way of further illustration, in certain implementations a sequence identifier can be received. In certain implementations, such a sequence identifier can be received by consumer 110C and/or stream consumption engine 114, as shown in FIG. 1C. Additionally, in certain implementations such a sequence identifier can be received in response to a request (e.g., the request provided at operation 320). As described herein, such a sequence identifier can reflect the relative position of a shard (and/or message(s)) within a sequence.

By way of illustration, in a scenario in which consumer 110C (as shown in FIG. 1B) fails or malfunctions after pushing shard 'S4,' upon reinitializing, the consumer can request the sequence identifier associated with such a shard (e.g., from stream 140C and/or server 120). Upon receiving the associated sequence identifier, consumer 110C can determine that shard 'S4' has been successfully pushed, and can thus reinitialize operation to continue pushing, processing, etc. subsequent shard(s). Doing so can enable such shards, messages, records, etc., to be pulled and processed 'exactly once,' without needing redundant operations and/or multiple copies to ensure all messages are pulled/processed.

At operation 330, a second shard is provided. In certain implementations, such a shard can be provided within a data stream based on the received state attribute(s) (e.g., as received at operation 325). By way of illustration, in a scenario in which consumer 110C (as shown in FIG. 1B) fails or malfunctions after pulling or processing shard 'S4,' upon reinitializing, the consumer can request (e.g., at operation 320) the state attribute 152C associated with such a shard (e.g., from stream 140C and/or server 120). Upon receiving (e.g., at operation 325) the associated state attribute (here, 'X2'), consumer 110C can determine that shard 'S4' has been successfully pulled/processed, and can reinitialize operation to continue pulling or processing subsequent shard(s) (e.g., shard 'S5'). Doing so can enable such shards, messages, records, etc., to be pulled and processed 'exactly once,' without needing redundant operations and/or multiple copies to ensure all messages are handled.

By way of further example, the referenced second shard can be provided within a data stream based on a received attribute (e.g., a state attribute, such as is received at operation 325). By way of illustration, in a scenario in which consumer 110C (as shown in FIG. 1B) fails or malfunctions after pulling or processing shard 'S4,' upon reinitializing, the consumer can request the state attribute 152C associated with such a shard (e.g., from stream 140C and/or server 120). Upon receiving the associated state attribute (here, 'X2'), consumer 110C can determine its state (e.g., at the time the shard, etc., was pulled/processed) and can reinitialize operation to such a state (and continue pulling/processing subsequent shard(s)). As described herein, such a configuration can enable the consumer to operate in a stateless manner.

At operation 335, an adjustment of an operation of a message production source can be initiated. That is, as described herein, the referenced shard(s) can be associated with various attribute(s) (e.g., attribute 152D as shown in FIG. 1B). As also described herein, in certain implementations, producer 110A can request and/or receive certain attributes (based upon which the producer can, for example, determine which shards have/have not been provided within a stream). Accordingly, in certain implementations, such attribute(s) can also be used to control or adjust operation of the producer. For example, in certain implementations server 120 (e.g., a streaming system/service) and/or consumer 110C can associate, assign, or update certain attribute(s) with respect to a shard (e.g., as stored in repository 122). Upon receiving a request from the producer (e.g., as described above at operation 220), such control attribute(s) can be provided to the producer. Upon receiving such attribute(s) (e.g., as described at operation 225), the producer can adjust its operation accordingly. Additionally, in certain implementations, the adjustment of such operation(s) by producer 110A can be initiated by consumer 110C via updates to the described state attribute(s).

By way of illustration, in one scenario such an attribute 152D can reflect whether the producer is (or is not) to remain active. Such an attribute can be dictated or provided by another entity (e.g., streaming system 120, consumer 110C, and/or another source).

Accordingly, upon receiving a shard (e.g., shard 'S4' as shown in FIG. 1B) and storing/maintaining such a shard (e.g., within repository 122), server 120 can associate attribute 152D to the shard which can reflect, for example, that producer 110A is to be disabled. Upon receiving a request (e.g., from producer 110A) for such attribute(s), the 'disable' attribute can be returned (and received by producer 110A). Producer 110A can then adjust its operation (here, disabling itself from providing subsequent shards, messages, etc.) and/or perform corresponding operations. In doing so attributes/identifiers originating from a consumer can be used to initiate operations by the described producer (which instructions can be transmitted via push/pull operations of the producer), thereby enabling additional functionality.

Additionally, in certain implementations, the referenced attribute 152D (which can be used to adjust/control operation of the producer) can include/reflect a token. Such a token may be assigned (e.g., to a shard, message, etc.) based on a processing capacity of a streaming system and/or a consumer. In certain implementations, such a token can be assigned by the streaming system 120 and/or by a consumer (e.g., consumer 110C) of the stream. For example, the referenced tokens can be used to implement flow control operations which can, for example, adjust operation of the producer (e.g., in scenarios in which shards, messages, etc., are being provided too quickly).

By way of illustration, system 120 (and/or a consumer) can assign a token to a shard, e.g., as attribute 152D as shown in FIG. 1B. The system can be configured to assign a certain number of tokens (e.g., 1000 tokens per second to a stream originating from a particular producer) and may be further configured to only store/maintain those shards being assigned a token (e.g., in repository 122). The system 120 can also be configured to adjust (e.g., increase or decrease) the number of tokens (e.g., in scenarios in which it may be advantageous for system and/or consumer(s) to increase/decrease the rate at which messages, shards, etc., are being received from the stream). While those shards, messages, etc., can be stored/maintained (e.g., in repository 122), those shards, messages, etc. not assigned a token may not be stored/maintained (until they are assigned a token). In doing so, the flow of shards, messages, etc., from the producer can be further controlled (e.g., by a consumer) using push/pull operations initiated by the producer (without a separate control channel to control operation).

Figure 4A:
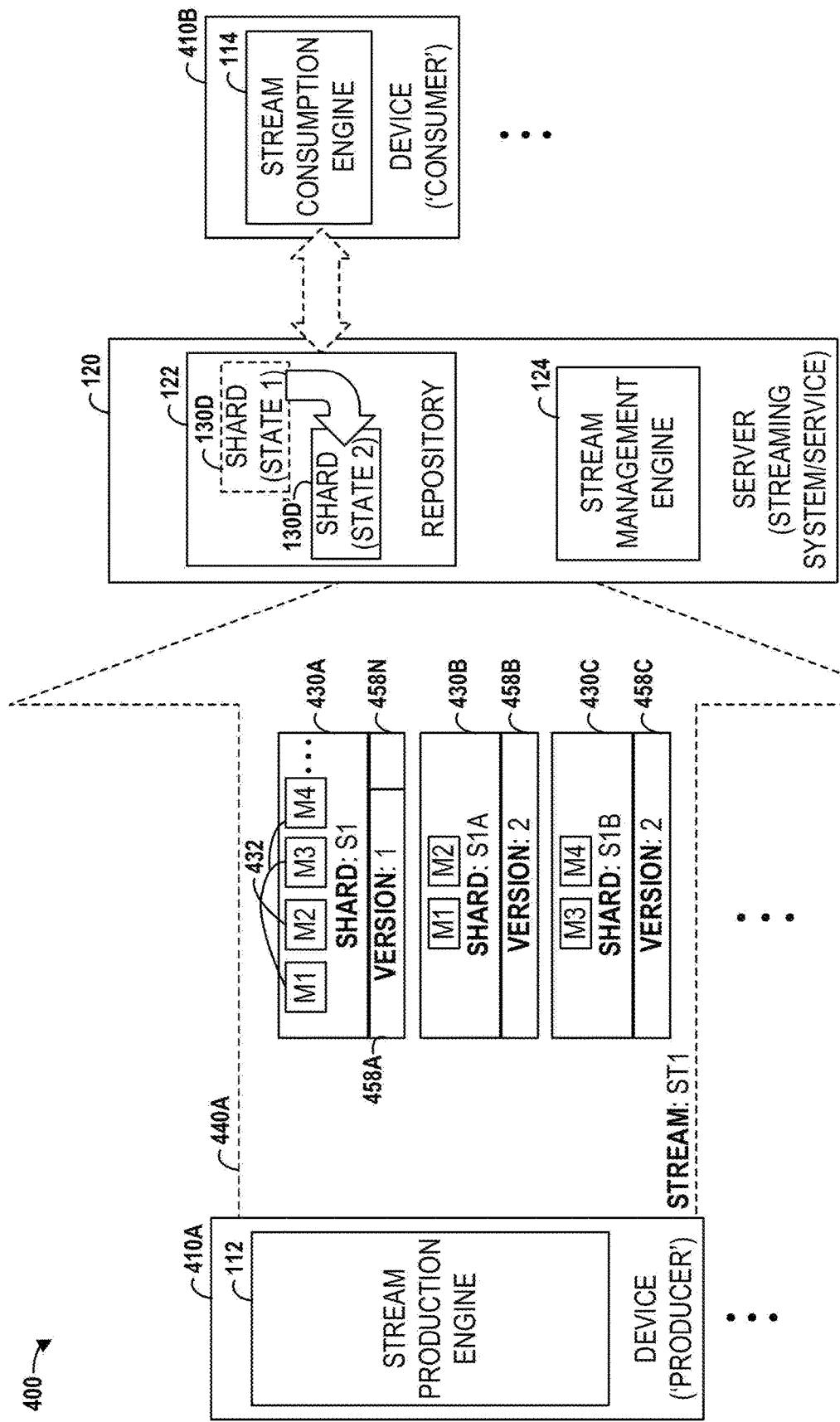
FIG. 4A illustrates an example system, in accordance with an example embodiment.
Figure 5A:
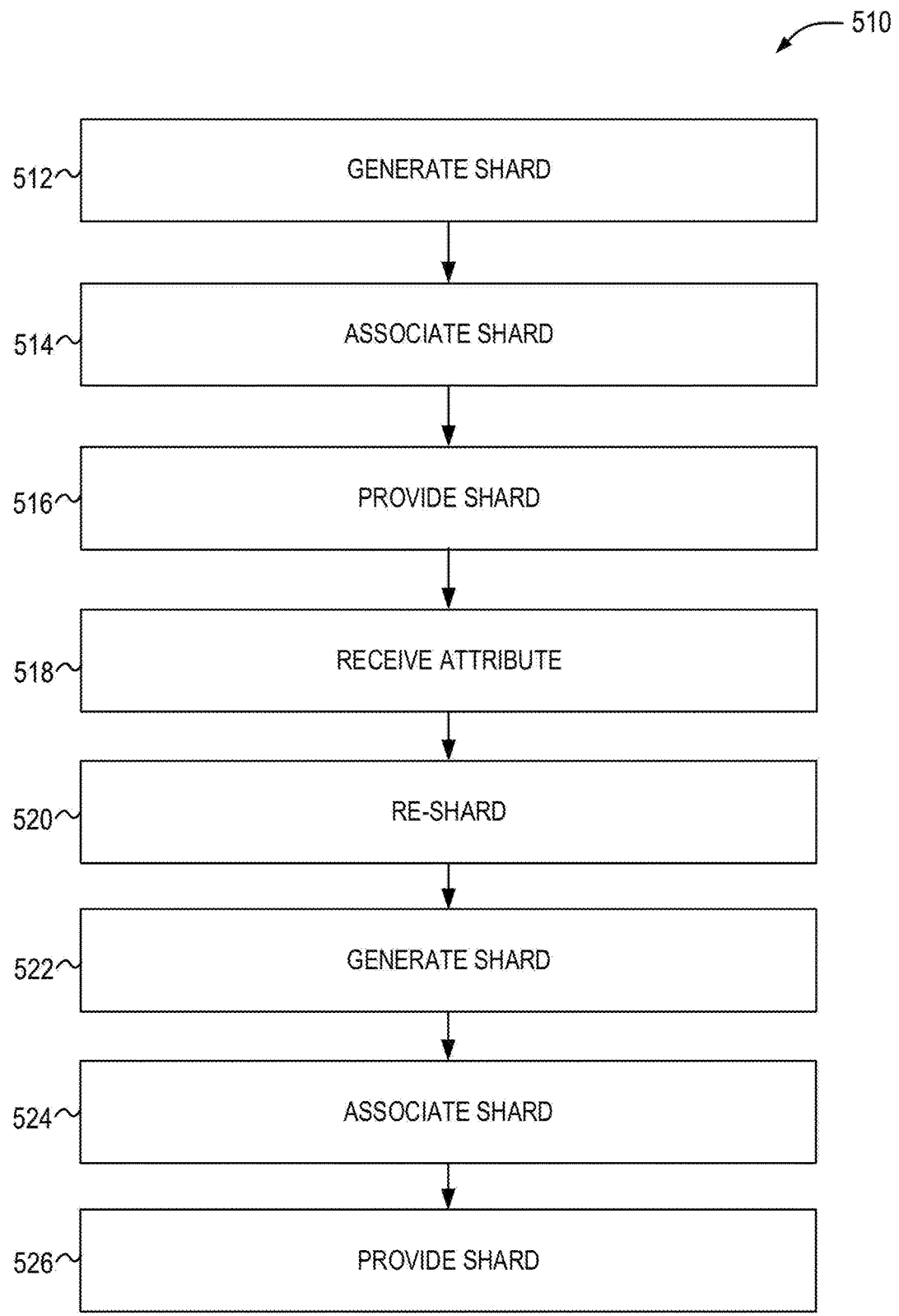
FIG. 5A is a flow chart illustrating a method, in accordance with an example embodiment, for stateless stream handling and resharding.

FIG. 5A is a flow chart illustrating a method 510, according to an example embodiment, for stateless stream handling and resharding. The method is performed by processing logic that can comprise hardware (circuitry, dedicated logic, etc.), software (such as is run on a computing device such as those described herein), or a combination of both. In one implementation, the method 510 is performed by one or more elements depicted and/or described in relation to FIG. 4A (including but not limited to device 410A and/or stream production engine 112), while in some other implementations, the one or more blocks of FIG. 5A can be performed by another machine or machines.

At operation 512, a first shard is generated. In certain implementations, such a shard can include or incorporate various messages, events, records, etc., as described herein. For example, as shown in FIG. 4A, shard 430A ('S1') can be generated by producer 410A. Such a shard can include messages 432 ('M1'-'M4').

At operation 514, the first shard (e.g., the shard generated at operation 512) can be associated with an attribute such as a shard version attribute (e.g., attribute 458A, as shown in FIG. 4A). Such a shard version attribute can reflect, for example, a number or value that corresponds to the version of the shard (e.g., as generated by producer 410A). That is, it can be appreciated that while messages, data, records, etc., within a stream can be divided up into shards, the size (and/or other aspects) of such shards may be suboptimal (e.g., in scenarios in which the streaming system and/or consumers cannot process such shards efficiently/optimally). Accordingly, as described herein, the referenced producer can be configured to re-shard the described shard(s), in order to enable previously pushed records to be pushed within shards that may provide better results, efficiency, etc., when handled by the described technologies. In certain implementations, in order to ensure consistency, such shards can be assigned a version number or value (the described shard version attribute) to ensure that up-to-date or most current shard(s) are processed (in lieu of previously pushed shards which have since been re-sharded).

Additionally, as described herein, the disclosed technologies can enable various operations, such as atomic updates and conditional updates, to be performed with respect to shard(s)/stream(s), e.g., based on the referenced shard version attribute(s). For example, a push operation can be generated/provided with a condition that reflects a particular shard version attribute. Accordingly, in a scenario in which the shard version changes, such a push operation can be rejected (as described herein).

At operation 516, the first shard (e.g., as generated at operation 512) and the first shard version attribute (e.g., as associated at operation 514) are provided or pushed e.g., as an update within data stream 440A (e.g., to system 120 and/or consumer 410B, as shown in FIG. 4A). For example, as shown in FIG. 4A, shard 430A can be pushed or provided by producer 410A. As noted, such an update can be, for example, an atomic update that includes multiple updates, operations, etc., that are to be performed collectively. In doing so, either all of the updates, operations, etc., are to be performed or the atomic update is rejected and none of the updates, operations, etc., are to be performed (e.g., in a scenario in which certain updates cannot be completed).

At operation 518, a state attribute is received (e.g., from system 120 and/or consumer 410B). In certain implementations, such a state attribute can reflect a processing capacity of a streaming system and/or a consumer. By way of illustration, such an attribute can reflect bandwidth, resources, etc., of various available producers.

At operation 520, the first shard (e.g., as generated at operation 512) is resharded, e.g., into a second shard, third shard, etc. In certain implementations, such resharding can be performed based on the first shard. For example, a second shard (e.g., shard 430B as shown in FIG. 4A) can be generated. Such a second shard can include message(s) (e.g., messages 'M1' and 'M2') originating from the first shard 430A.

Additionally, in certain implementations the referenced resharding can be performed or initiated based on the received first state attribute (e.g., at operation 518). For example, such a state attribute can reflect that the system 120 and/or consumer 410B may be overloaded or otherwise incapable of efficiently handling/processing the shards originating from producer 410A. In response, the producer can reshard previously pushed shards (e.g., shard 430A as shown in FIG. 4A), e.g., in to new shards (430B and 430C, which can contain fewer messages per shard, as shown). In doing so, such shards (even those that have already been pushed) can be updated in a manner that enables them to be handled, processed, etc., more efficiently (e.g., by multiple consumers).

At operation 522, a third shard is generated (e.g., in accordance with the resharding at operation 520). For example, as shown in FIG. 4A, shard 430C can be generated.

At operation 524, the second shard (e.g., as resharded/generated at operation 520) is associated with a second shard version attribute. As described herein, such a shard version attribute can reflect, for example, a number or value that corresponds to the version of the shard (e.g., as generated by producer 410A). For example, while shard 430A is associated with a shard version attribute 458A ('VERSION: 1'), shard 430B is associated with a shard version attribute 458B ('VERSION: 2,' reflecting that it is a newer, updated version of shard 430A).

Additionally, in certain implementations, in scenarios in which a shard is resharded (e.g., shard 430A as shown in FIG. 4A), an attribute reflecting a point or location within a shard or stream that corresponds to the resharding operation can be associated with the referenced shard. In certain implementations, such an attribute can be persisted in an atomic manner. For example, attribute 458N as shown in FIG. 4A can be associated with shard 430A (which is being resharded, as described herein). Such an attribute can reflect a point or location within the shard/stream that corresponds to the resharding operation (e.g., prior to/at the pushing and/or processing of message 'M1'). Maintaining such a point/location as an attribute of the shard/stream can be advantageous, for example, in enabling identification of the point at which the referenced resharding occurred. Doing so can enable multiple consumers to synchronize their operations, e.g., to ensure that messages from the referenced shard/stream are only processed once.

At operation 526, the second shard and the second shard version attribute are provided or pushed e.g., as an update (e.g., an atomic update or a conditional update) within data stream 440A (e.g., to system 120 and/or consumer 410B, as shown in FIG. 4A). For example, as shown in FIG. 4A, shard 430B can be pushed or provided by producer 410A. In certain implementations, such a second shard can be provided/pushed as an update within the data stream in lieu of another update (e.g., the update provided at operation 516). For example, such a push operation can include conditions that reflect particular shard version attributes. Accordingly, in a scenario in which the shard version changes, push operations that do not correspond to the updated shard version attribute can be rejected. In doing so, updated shard(s) can be provided/pushed, thereby enabling more efficient operation of the system and/or consumers. By way of further example, such an update can be, for example, an atomic update that includes multiple updates, operations, etc., that are to be performed collectively. In doing so, either all of the updates, operations, etc., are to be performed or the atomic update is rejected and none of the updates, operations, etc., are to be performed (e.g., in a scenario in which certain updates cannot be completed).

Figure 5B:
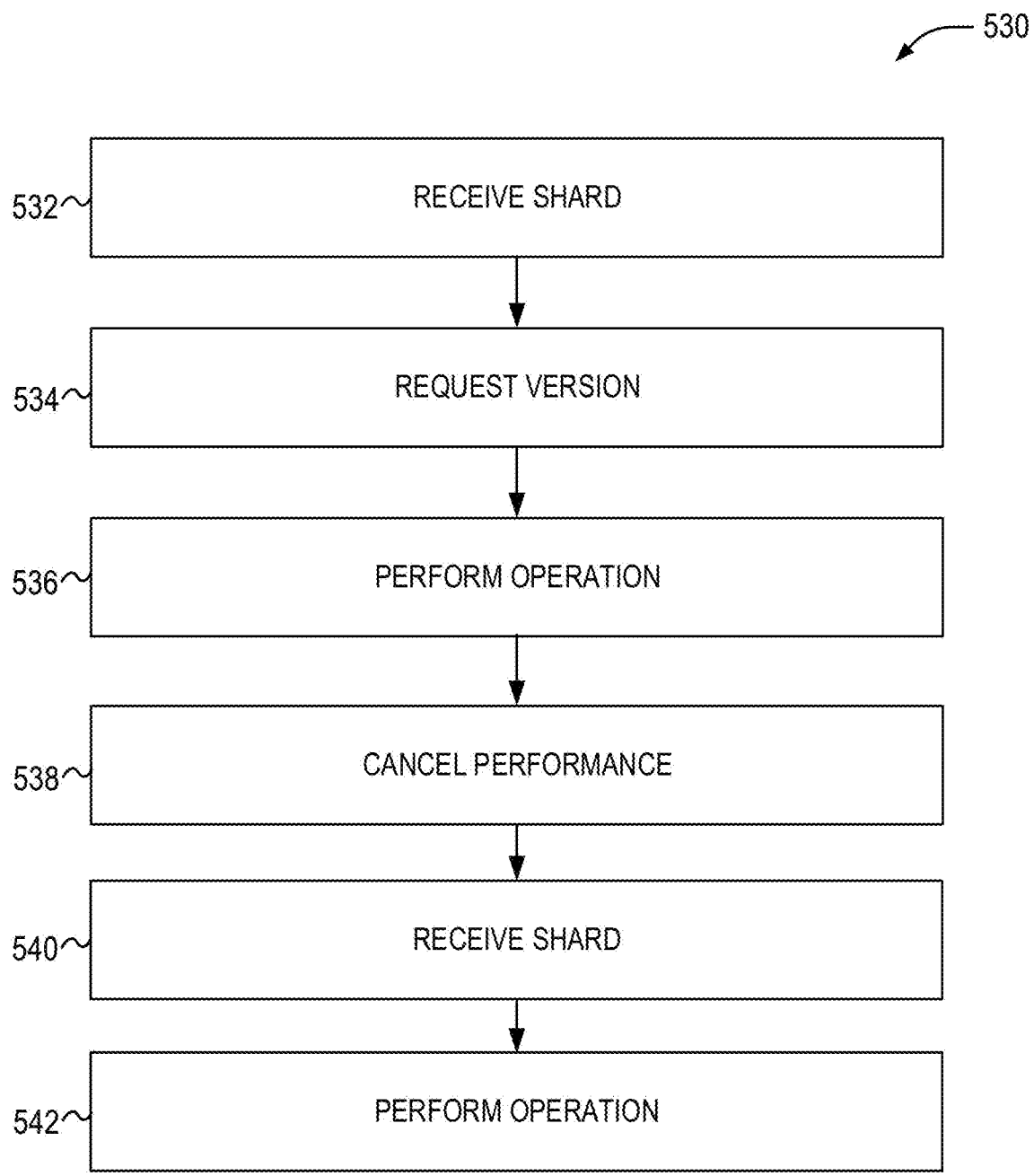
FIG. 5B is a flow chart illustrating a method, in accordance with an example embodiment, for stateless stream handling and resharding.

FIG. 5B is a flow chart illustrating a method 530, according to an example embodiment, for stateless stream handling and resharding. The method is performed by processing logic that can comprise hardware (circuitry, dedicated logic, etc.), software (such as is run on a computing device such as those described herein), or a combination of both. In one implementation, the method 530 is performed by one or more elements depicted and/or described in relation to FIG. 4A (including but not limited to server 120 and/or stream management engine 124), while in some other implementations, the one or more blocks of FIG. 5B can be performed by another machine or machines.

At operation 532, a first shard is received, e.g., from a device (e.g., producer 410A as shown in FIG. 4A and described herein. In certain implementations, such a shard (e.g., shard 430A) can include various message(s) 432 and attribute(s) such as a shard version attribute 458A. As described herein, such a shard version attribute can reflect, for example, a number or value that corresponds to the version of the shard.

At operation 534, a current shard version is requested, e.g., from the device (e.g., producer 410A as shown in FIG. 4A). For example, as described herein, though producer 410A may have pushed/provided shard 430A within stream 440A, the producer may have subsequently re-sharded the shard (e.g., by generating shards 430B, 430C, etc.). Accordingly, prior to processing, handling, etc. operation(s) associated with shard 430A, the current shard version can be requested (e.g., from producer 410A). In doing so, it can be determined/confirmed (e.g., based on a comparison of the current shard version provided by the producer and the shard version attribute of the received shard) whether the received shard is still the current version, or whether subsequent shard versions have been generated (and should be handled in lieu of the previous shard).

At operation 536, an operation, transformation, etc. is performed with respect to the first shard (e.g., the shard received at operation 532). In certain implementations, such an operation (e.g., providing the first shard to a consumer, etc.), can be performed based on a determination that the current shard version (e.g., as received from producer 410A and/or identified within stream 440A) is consistent with the first shard version attribute (e.g., the shard attribute associated with the shard as received at operation 532).

At operation 538, performance of the operation with respect to the first shard can be canceled. In certain implementations, such operation can be canceled based on a determination that the current shard version (e.g., as requested/received at operation 534) is not consistent with the first shard version attribute (e.g., the shard attribute associated with the shard as received at operation 532). For example, in the scenario depicted in FIG. 4A, system 120 can determine (e.g., based on an input, attribute, etc., originating from producer 410A) that the current shard version (e.g., as reflected in shards 430B, 430C, etc.) is version '2.' Accordingly, operations (e.g., processing, handling, etc.) associated with shard 430A (which corresponds to shard version '1') can be canceled (as such a shard has since been re-sharded, as described herein). In doing so, those shards that are up-to-date/current can be processed while those that are not current can be avoided, dropped, canceled, etc. It should be understood that the messages within the referenced shards ('M1'-'M4') are processed exactly once,' without necessitating multiple redundant processing instances for the same messages.

Additionally, as noted above, in certain implementations, a shard that is resharded (e.g., shard 430A as shown in FIG. 4A), can include/be associated with an attribute reflecting a point or location within the shard or stream that corresponds to the resharding operation. For example, attribute 458N can be associated with shard 430A (which is being resharded), reflecting the point/location within the shard/stream that corresponds to the resharding operation (e.g., prior to/at the pushing and/or processing of message 'M1'). Accordingly, in certain implementations, operations associated with/directed to such a shard/stream can be performed up to the point/location reflected in the referenced attribute. Operations associated with points/locations within such a shard/stream that are subsequent to the referenced point/location (e.g., within a sequence) can be canceled or rejected (as such operations are to be performed with respect to the subsequent version(s) of the shard, as described herein). Doing so can enable multiple consumers to synchronize their operations, e.g., to ensure that messages from the referenced shard/stream are only processed once.

At operation 540, a second shard is received, e.g., from the referenced producer (e.g., producer 410A as shown in FIG. 4A). In certain implementations, such a second shard (e.g., shard 430B) can include a second shard version attribute (e.g., attribute 458B, as shown in FIG. 4A and described herein).

At operation 542, an operation is performed with respect to the second shard (e.g., shard 430B as received at operation 540). In certain implementations, such an operation (e.g., an update or other such processing operation) can be performed with respect to the second shard (e.g., shard 430B as received at operation 540) in lieu of performing such an operation with respect to the first shard (e.g., shard 430A as received at operation 532). In certain implementations, such an operation can be performed (e.g., with respect to shard 430B) based on a determination that the current shard version (e.g., of the producer 410A) is consistent with the second shard version attribute (e.g., 'VERSION: 2').

Figure 4B:
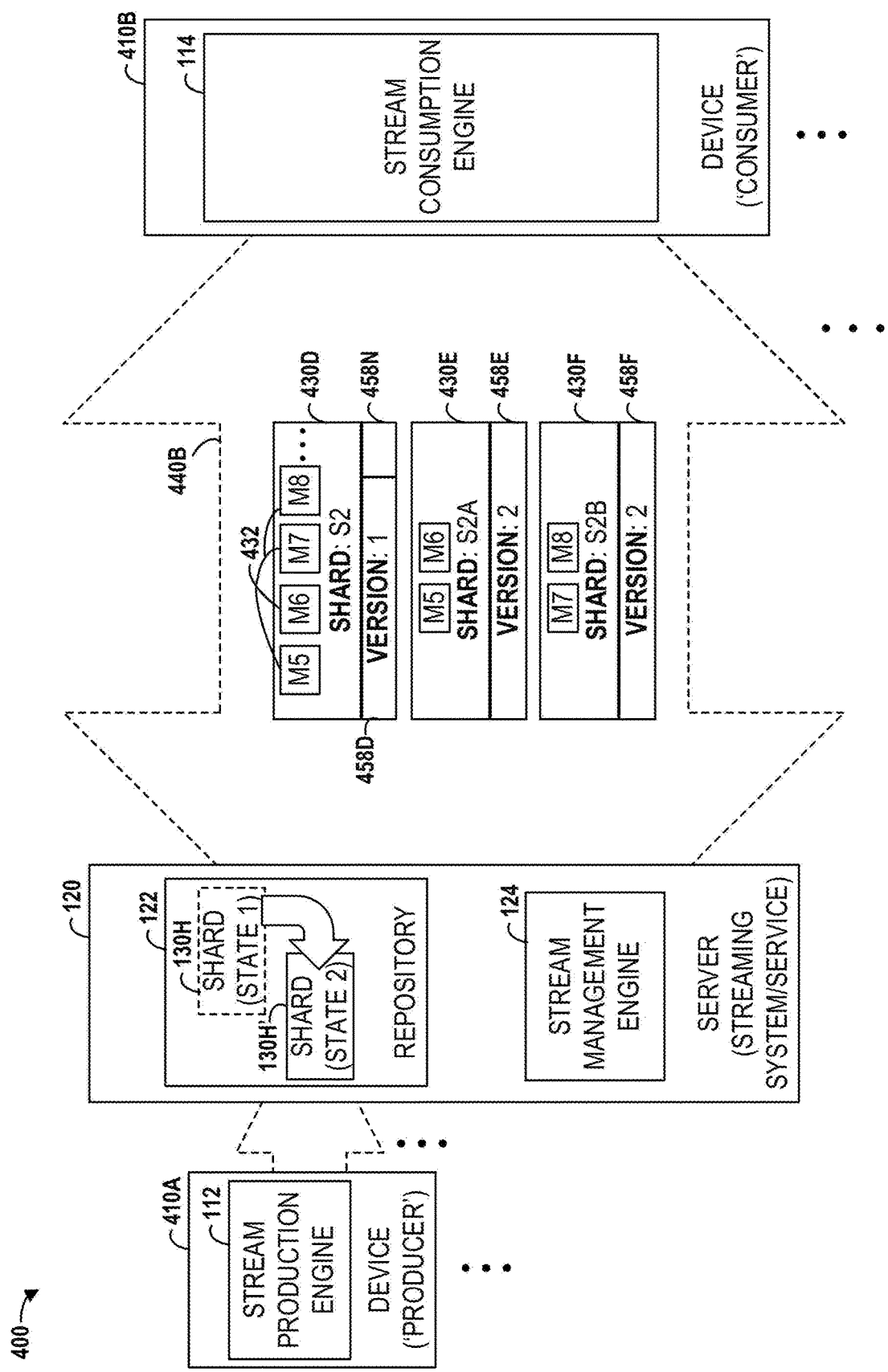
FIG. 4B illustrates an example system, in accordance with an example embodiment.
Figure 5C:
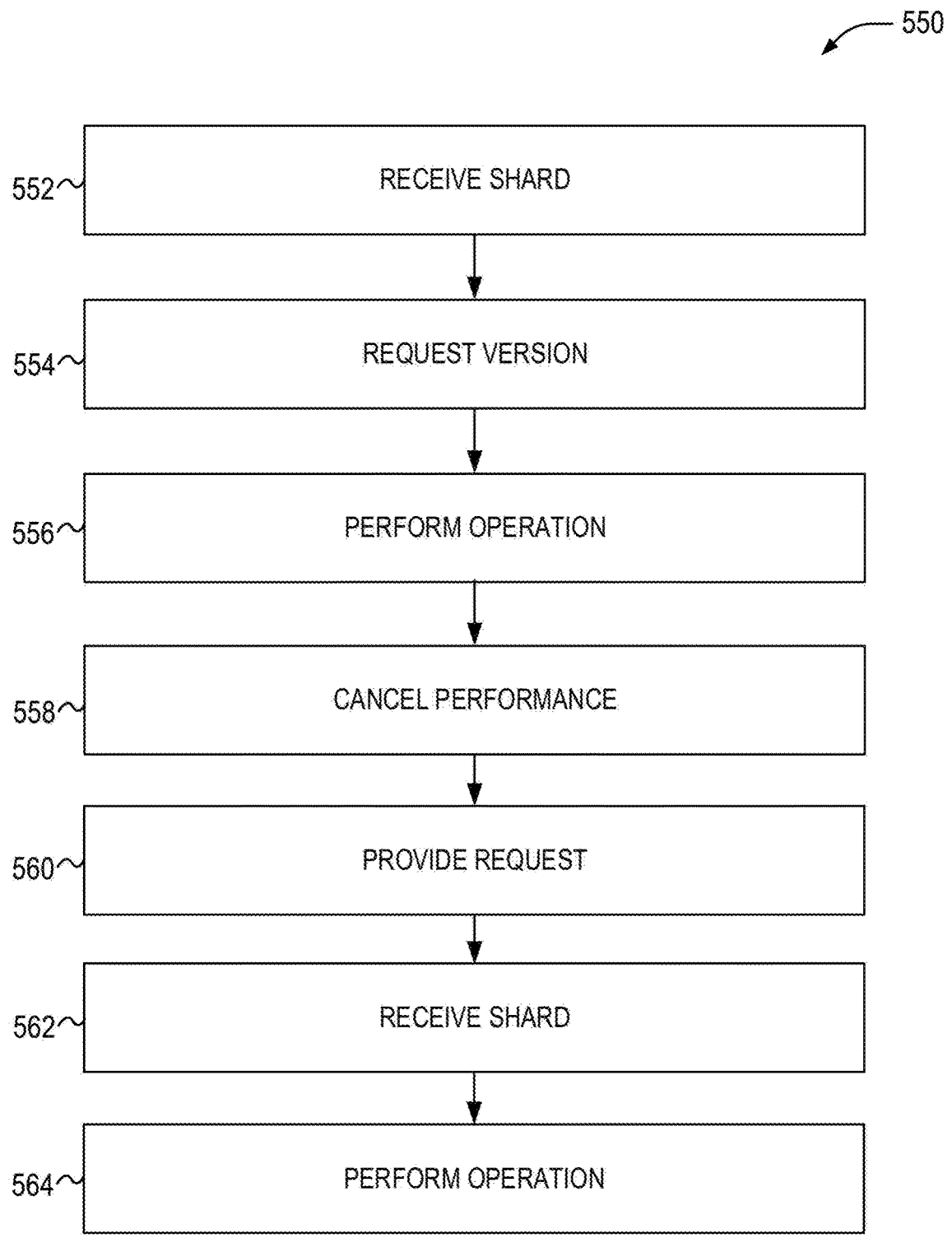
FIG. 5C is a flow chart illustrating a method, in accordance with an example embodiment, for stateless stream handling and resharding.

FIG. 5C is a flow chart illustrating a method 550, according to an example embodiment, for stateless stream handling and resharding. The method is performed by processing logic that can comprise hardware (circuitry, dedicated logic, etc.), software (such as is run on a computing device such as those described herein), or a combination of both. In one implementation, the method 550 is performed by one or more elements depicted and/or described in relation to FIG. 4B (including but not limited to device 410B and/or stream consumption engine 114), while in some other implementations, the one or more blocks of FIG. 5C can be performed by another machine or machines.

At operation 552, a first shard is received (e.g., by consumer 410B as shown in FIG. 4B). In certain implementations, such a shard can include various message(s) and attribute(s) such as a shard version attribute. For example, as shown in FIG. 4B, shard 430D can be received by consumer 410B. Such a shard 430D can include messages 432 ('M5'-'M8') and shard version attribute 458D ('VERSION: 1'). As described herein, such a shard version attribute can reflect, for example, a number or value that corresponds to the version of the shard 430D.

At operation 554, a current shard version is requested. In certain implementations, such a current version can be requested from system 120 and/or producer 410A (e.g., the producer from which the shard originated). For example, as described herein, though producer 410A may have pushed/provided shard 430D, the producer may have subsequently re-sharded the shard (e.g., by generating shards 430E, 430F, etc., as shown in FIG. 4B). Accordingly, prior to processing, handling, etc. operation(s) associated with shard 430D, the current shard version can be requested. In doing so, it can be determined/confirmed whether the received shard 430D is still the current version, or whether subsequent shard versions have been generated (and should be handled in lieu of the previous shard).

At operation 556, an operation, transformation, etc. is performed with respect to the first shard (e.g., the shard received at operation 552). In certain implementations, such an operation (e.g., analyzing, processing, etc. the first shard), can be performed based on a determination that the current shard version (e.g., as received from producer 410A or system 120 and/or identified within stream 440B) is consistent with the first shard version attribute (e.g., the shard attribute associated with the shard as received at operation 552).

At operation 558, performance of the operation with respect to the first shard can be canceled. In certain implementations, such operation can be canceled based on a determination that the current shard version (e.g., as requested/received at operation 554) is not consistent with the first shard version attribute (e.g., the shard attribute associated with the shard as received at operation 552). For example, in the scenario depicted in FIG. 4B, it can be determined that the current shard version (e.g., as reflected in shards 430E, 430F, etc.) is version '2.' Accordingly, processing, handling, etc., of shard 430D (which corresponds to shard version '1') can be canceled (as such a shard has since been re-sharded, as described herein). In doing so, those shards that are up-to-date/current can be processed while those that are not current can be avoided, dropped, canceled, etc. It should be understood that the messages within the referenced shards ('M5'-'M8') are processed exactly once,' without necessitating multiple redundant processing instances for the same messages.

Additionally, as noted above, in certain implementations, a shard that is resharded (e.g., shard 430D as shown in FIG. 4B), can include/be associated with an attribute reflecting a point or location within the shard or stream that corresponds to the resharding operation. For example, attribute 458N can be associated with shard 430D (which is being resharded), reflecting the point/location within the shard/stream that corresponds to the resharding operation (e.g., prior to/at the pushing and/or processing of message 'M5'). Accordingly, in certain implementations, operations associated with/directed to such a shard/stream can be performed up to the point/location reflected in the referenced attribute. Operations associated with points/locations within such a shard/stream that are subsequent to the referenced point/location (e.g., within a sequence) can be canceled or rejected (as such operations are to be performed with respect to the subsequent version(s) of the shard, as described herein). Doing so can enable multiple consumers to synchronize their operations, e.g., to ensure that messages from the referenced shard/stream are only processed once.

At operation 560, a resharding request is provided. In certain implementations, such a request can be provided to system 120 and/or producer 410A. Such a resharding request can be provided, for example, based on a processing capacity (and/or other aspects, resources, etc.) of the producer 410B (and/or other producers). By way of illustration, upon determining that the consumer cannot efficiently or optimally process shards with four (or more) messages, a resharding request can be generated/provided (e.g., to system 120 and/or producer 410A), requesting that the referenced shard(s) (which may contain four or more messages) be resharded (e.g., to include two messages, as shown).

At operation 562, a second shard is received (e.g., in response to the request at operation 560). In certain implementations, such a shard can include a second shard version attribute. Additionally, in certain implementations the referenced shard can be received/originate from system 120 and/or producer 410A (as shown in FIG. 4B). In certain implementations, such a second shard (e.g., shard 430E) can include a second shard version attribute (e.g., attribute 458E, as shown in FIG. 4B and described herein).

At operation 564, an operation is performed with respect to the second shard (e.g., shard 430E as received at operation 562) in lieu of performing an operation with respect to the first shard (e.g., shard 430D as received at operation 552). In certain implementations, such an operation (e.g., with respect to shard 430E) can be performed based on a determination that the current shard version (e.g., of the producer 410A) is consistent with the second shard version attribute (e.g., 'VERSION: 2').

While many of the examples described herein are illustrated with respect to single server and/or individual devices, this is simply for the sake of clarity and brevity. However, it should be understood that the described technologies can also be implemented (in any number of configurations) across multiple devices and/or other machines/services.

It should also be noted that while the technologies described herein are illustrated primarily with respect to stateless stream handling and resharding, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1A-5C are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the general, non-programmed machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example implementation, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fi® signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a processing device; and
a memory coupled to the processing device and storing instructions that, when executed by the processing device, cause the system to perform operations comprising:
generating a first shard comprising one or more messages;
associating the first shard with a first state attribute;
providing the first shard and the first state attribute as an atomic update within a data stream;
requesting the first state attribute from the first shard, wherein the first state attribute comprises a token that reflects a processing capacity of a streaming system;
receiving the first state attribute;
providing a second shard within the data stream based on the received first state attribute; and
adjusting an operation of a message production source of at least one of the one or more messages within the streaming system based on the received token that reflects the processing capacity of the streaming system.

2. The system of claim 1, wherein the first state attribute reflects an importance of one or more of the messages.

3. The system of claim 1, wherein the first state attribute reflects a location of one or more of the messages.

4. The system of claim 1, wherein an operation associated with the first shard is performed based on the first state attribute.

5. The system of claim 1, wherein the atomic update comprises a plurality of updates that are collectively performed or rejected.

6. The system of claim 1, wherein providing the first shard and the first state attribute comprises providing the first shard and the first state attribute as a conditional update within the data stream.

7. The system of claim 1, wherein the first state attribute comprises a first sequence identifier.

8. A non-transitory computer readable medium having instructions stored thereon that, when executed by a processing device, cause the processing device to perform operations comprising:
generating a first shard comprising one or more messages;
associating the first shard with a first state attribute;
providing the first shard and the first state attribute as an update within a data stream;
requesting the first state attribute from the first shard, wherein the first state attribute comprises a token that reflects a processing capacity of a streaming system;
receiving the first state attribute;
providing a second shard within the data stream based on the received first state attribute; and
adjusting an operation of a message production source of at least one of the one or more messages within the streaming system based on the received token that reflects the processing capacity of the streaming system.

9. The non-transitory computer-readable medium of claim 8, wherein an operation associated with the first shard is performed based on the first state attribute.

10. The non-transitory computer-readable medium of claim 8, wherein providing the first shard and the first state attribute comprises providing the first shard and the first state attribute as at least one of (a) an atomic update or (b) a conditional update within the data stream.

11. A method comprising:
generating a first shard comprising one or more messages;
associating the first shard with a first state attribute;
providing the first shard and the first state attribute as an atomic update within a data stream;
requesting the first state attribute from the first shard, wherein the first state attribute comprises a token that reflects a processing capacity of a streaming system;
receiving the first state attribute;
providing a second shard within the data stream based on the received first state attribute; and
adjusting an operation of a message production source of at least one of the one or more messages within the streaming system based on the received token that reflects the processing capacity of the streaming system.

12. The method of claim 11, wherein the first state attribute reflects an importance of one or more of the messages.

13. The method of claim 11, wherein the first state attribute reflects a location of one or more of the messages.

14. The method of claim 11, wherein an operation associated with the first shard is performed based on the first state attribute.

15. The method of claim 11, wherein the atomic update comprises a plurality of updates that are collectively performed or rejected.

16. The non-transitory computer-readable medium of claim 8, wherein the first state attribute reflects an importance of one or more of the messages.

17. The non-transitory computer-readable medium of claim 8, wherein the first state attribute reflects a location of one or more of the messages.

18. The non-transitory computer-readable medium of claim 8, wherein the update comprises a plurality of updates that are collectively performed.

19. The non-transitory computer-readable medium of claim 8, wherein the update comprises a plurality of updates that are collectively rejected.

20. The non-transitory computer-readable medium of claim 8, wherein the first state attribute comprises a first sequence identifier.

* * * * *